United States Patent
Bliss et al.

(10) Patent No.: US 9,486,730 B2
(45) Date of Patent: Nov. 8, 2016

(54) OXYGEN SEPARATOR AND METHOD OF GENERATING OXYGEN

(71) Applicant: KONINKLIJKE PHILIPS N.V., Eindhoven (NL)

(72) Inventors: Peter Lower Bliss, Prior Alake, PA (US); Rainer Hilbig, Aachen (DE); Joseph Thomas Dolensky, Kennesaw, GA (US); Achim Gerhard Rolf Koerber, Eindhoven (NL); Paul Van Der Sluis, Eindhoven (NL); Mareike Klee, Straelen (DE); Wilhelmus Cornelis Keur, Weert (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/401,317

(22) PCT Filed: May 8, 2013

(86) PCT No.: PCT/IB2013/053710
§ 371 (c)(1),
(2) Date: Nov. 14, 2014

(87) PCT Pub. No.: WO2013/171628
PCT Pub. Date: Nov. 21, 2013

(65) Prior Publication Data
US 2015/0128800 A1 May 14, 2015

Related U.S. Application Data
(60) Provisional application No. 61/647,600, filed on May 16, 2012.

(51) Int. Cl.
*B01D 53/02* (2006.01)
*B01D 53/04* (2006.01)
*B01D 53/047* (2006.01)

(52) U.S. Cl.
CPC ....... *B01D 53/0407* (2013.01); *B01D 53/0438* (2013.01); *B01D 53/047* (2013.01);
(Continued)

(58) Field of Classification Search
CPC .............. B01D 2253/108; B01D 2256/12; B01D 2257/102; B01D 2257/40; B01D 2257/80; B01D 2259/40052; B01D 2259/40096; B01D 2259/4533; B01D 2259/4541; B01D 53/0407; B01D 53/0438; B01D 53/047
See application file for complete search history.

(56) References Cited

U.S. PATENT DOCUMENTS

| | | |
|---|---|---|
| 5,030,260 A | 7/1991 | Beck |
| 5,417,743 A | 5/1995 | Dauber |
| 6,551,384 B1 | 4/2003 | Ackley |
| 7,160,367 B2 | 1/2007 | Babicki |
| 7,550,036 B2 | 6/2009 | Lee |

(Continued)

FOREIGN PATENT DOCUMENTS

| | | |
|---|---|---|
| CN | 102348489 A | 2/2012 |
| WO | WO2012038860 A1 | 3/2012 |

*Primary Examiner* — Christopher P Jones
(74) *Attorney, Agent, or Firm* — Michael W. Haas

(57) ABSTRACT

The invention relates to an oxygen separation device (12, 14), comprising a gas inlet (29, 31) at a primary side for guiding a flow of oxygen comprising gas into the oxygen separation device (12, 14) and having a gas outlet (33, 35) at a secondary side for guiding a flow of oxygen enriched gas out of the oxygen separation device (12, 14), at least one oxygen separation area (20, 22) with an oxygen separation sorbent (16, 18) being capable of separating oxygen from an oxygen comprising gas by sorbing at least one component of the oxygen comprising gas apart from oxygen and being contaminatable by a contaminant, and a decontamination area (21, 23) with a decontamination material (17, 19) for decontaminating the oxygen comprising gas from at least one contaminant, wherein the oxygen separation area (20, 22) and the decontamination area (21, 23) are fluidly connected by a spacer (76, 78) comprising at least one diffusion reducing channel (80, 82), wherein the spacer (76, 78) has a value of diffusion reduction $r_R$ of $r_R > 1$. Such an oxygen separation device (12, 14) allows (10) provides significant advantages with respect to maintenance. The invention further relates to an oxygen separator (10) and to a method of generating oxygen from an oxygen comprising gas.

14 Claims, 4 Drawing Sheets

(52) U.S. Cl.
CPC ..... *B01D2253/108* (2013.01); *B01D 2256/12* (2013.01); *B01D 2257/102* (2013.01); *B01D 2257/40* (2013.01); *B01D 2257/80* (2013.01); *B01D 2259/40052* (2013.01); *B01D 2259/40096* (2013.01); *B01D 2259/4533* (2013.01); *B01D 2259/4541* (2013.01)

(56) References Cited

U.S. PATENT DOCUMENTS

| | | |
|---|---|---|
| 7,717,981 B2 | 5/2010 | LaBuda |
| 2008/0022857 A1 | 1/2008 | White |
| 2011/0113964 A1 | 5/2011 | Chambers |
| 2011/0232482 A1 | 9/2011 | Knaebel |
| 2012/0011887 A1 | 1/2012 | Nakamura |

OXYGEN SEPARATOR AND METHOD OF GENERATING OXYGEN

CROSS-REFERENCE TO RELATED APPLICATIONS

This patent application claims the priority benefit under 35 U.S.C. §371 of international patent application no. PCT/IB2013/053710, filed May 8, 2013, which claims the priority benefit under 35 U.S.C. §119(e) of U.S. Provisional Application No. 61/647,600 filed on May 16, 2012, the contents of which are herein incorporated by reference.

FIELD OF THE INVENTION

The invention relates to the field of oxygen separation. More specifically, the invention relates to oxygen separation for therapeutic applications, particularly in the field of home care.

BACKGROUND OF THE INVENTION

Oxygen therapy is the administration of oxygen as a therapeutic modality. It is widely used for a variety of purposes in both chronic and acute patient care as it is essential for cell metabolism, and in turn, tissue oxygenation is essential for all physiological functions. Oxygen therapy should be used to benefit the patient by increasing the supply of oxygen to the lungs and thereby increasing the availability of oxygen to the body tissues, especially when the patient is suffering from hypoxia and/or hypoxemia. Oxygen therapy may be used both in applications in hospital or in home care. The main home care application of oxygen therapy is for patients with severe chronic obstructive pulmonary disease (COPD).

Oxygen may be administered in a number of ways. A preferable way of oxygen administration is by using a so called on demand generation of oxygen. Referring to this, commercial solutions, so-called oxygen concentrators or separators, respectively, are widely known. These oxygen concentrators mostly separate oxygen from an oxygen comprising gas, so that the oxygen is provided on demand, i.e. directly before use.

A drawback of the oxygen concentrators, or oxygen separators, respectively, known in the art is the fact that next to desired adsorbed constituents of the oxygen comprising gas, such as nitrogen, for example, undesired contaminants of the oxygen comprising gas, such as water or carbon dioxide, are adsorbed to an oxygen separation device or an oxygen separation material, respectively, thereby contaminating the latter. This contamination of the oxygen separation material often causes the requirement of additional more or less complex measures next to a swing process in order to prevent contamination or to desorb the contaminants again.

Known from U.S. Pat. No. 7,160,367 is a gas separation device being capable of performing a gas separation step using adsorbents sensitive to contaminant deactivation, such as deactivation by atmospheric humidity. Such a gas separation device may comprise a desiccant zone and a water-sensitive adsorber zone between which a respective isolation valve may be provided.

There is, however, still the need for improving the contamination behavior of oxygen separation devices.

SUMMARY OF THE INVENTION

It is an object of the present invention to provide an oxygen separation device for an oxygen separator and a method of separating oxygen from an oxygen comprising gas which is cost-saving to build, easy to perform, and/or which is advantageous with respect to maintenance.

This object is achieved by an oxygen separation device according to claim 1. This object is furthermore achieved by an oxygen separator according to claim 11 and by a method of separating oxygen from an oxygen comprising gas according to claim 13. Preferred embodiments are defined in the dependent claims.

An oxygen separation device comprises a gas inlet at a primary side for guiding a flow of oxygen comprising gas into the oxygen separation device and having a gas outlet at a secondary side for guiding a flow of oxygen enriched gas out of the oxygen separation device, at least one oxygen separation area with an oxygen separation sorbent being capable of separating oxygen from an oxygen comprising gas by sorbing at least one component of the oxygen comprising gas apart from oxygen and being contaminatable by a contaminant, and a decontamination area with a decontamination material for decontaminating the oxygen comprising gas from at least one contaminant, wherein the oxygen separation area and the decontamination area are fluidly connected by a spacer comprising at least one diffusion reducing channel, wherein the spacer has a value of diffusion reduction $r_R$ of $r_R > 1$.

The term oxygen separation device may particularly refer to the active part of an oxygen separator. It may for example comprise an oxygen separation sorbent which may interact with an oxygen comprising gas, or with defined constituents of the latter, and may thus separate oxygen from the oxygen comprising gas by means of interaction with at least one constituent of the oxygen comprising gas apart from oxygen. Consequently, the oxygen separation device as such, or its oxygen separation sorbent, respectively, is capable of separating oxygen from an oxygen comprising gas particularly by sorption processes, such as adsorption processes. It may thus be designed as an adsorber bed. It may exemplarily be formed as a compact device being equipped an arranged in a housing.

Correspondingly, the term oxygen separator as used herein may particularly refer to a device which is capable of separating oxygen from an oxygen comprising gas. Consequently, by means of an oxygen separator, starting from an oxygen comprising gas, pure or essentially pure oxygen or at least oxygen enriched gas may be generated.

Furthermore, the term primary side of the oxygen separation device, as used herein, may refer to the side or the part of the oxygen separation device being directed towards the direction, at which the oxygen comprising gas is guided to the oxygen separation device, whereas the term secondary side of the oxygen separation device, as used herein, may refer to the side or the part of the oxygen separation device being directed towards the opposite side, i.e. to the side at which the generated pure oxygen or oxygen enriched gas is present.

Additionally, the term oxygen comprising gas, as used herein, may refer to any gas which at least partly comprises gaseous oxygen, or which consists of oxygen. The term oxygen enriched gas shall thereby particularly mean a gas which has a higher concentration with respect to oxygen compared to the oxygen comprising gas and which may in an extreme case be pure oxygen.

The expression of the separation sorbent being contaminatable by a contaminant may particularly refer to a contamination or pollution process of the oxygen separation sorbent because of which the oxygen separation capacity and/or the selectivity of the oxygen separation device towards oxygen is decreased. A contaminant may thereby be any compound which may bind or sorb, for example irreversibly or reversibly, to the oxygen separation device and may thus contaminate it. It may particularly be a substance which is not a main component of the oxygen comprising gas. It may be present in the oxygen comprising gas only optionally and/or only in variable amounts. Non limiting examples of contaminants potentially being present in the oxygen comprising gas may comprise water, carbon dioxide, amines, sulfur oxides, nitrogen oxides and hydrocarbons.

An oxygen separation sorbent may furthermore be understood as a material which sorbs and thus adsorbs or absorbs at least one substance from the oxygen comprising gas except oxygen much better than oxygen and thus lets oxygen pass at least in a big amount.

An oxygen separation area according to the present invention shall particularly mean a spatially limited area, or a region, respectively, in which the oxygen separation sorbent is provided and which has as main object to separate oxygen from an oxygen comprising gas.

Correspondingly, a decontamination area may particularly mean a spatially limited area or a region, respectively, which has as main object to decontaminate the oxygen comprising gas from potentially present contaminants. Therefore, a decontamination material is located in the decontamination area and thus a material which interacts and sorbs at least one contaminant and thus removes it from the oxygen comprising gas. The decontamination material may be the same or different with respect to the oxygen separation sorbent.

A spacer may further be understood as a device spatially separating the oxygen separation area and the decontamination are from each other and providing a fluid connection between the oxygen separation area and the decontamination area.

A diffusion reducing channel may furthermore be understood as a conduct which limits the diffusion rate of a contaminant, particularly a gaseous contaminant, from the decontamination area to the oxygen separation area.

Furthermore, the value of diffusion reduction $r_R$ may be defined as follows. In detail, the diffusion reduction factor or the value of diffusion reduction $r_R$ respectively is the product of the characteristic contaminated length Z and the spacer characteristic parameter S ($r_R=Z*S$), wherein the characteristic contaminated length Z is defined as $Z=(f_W*A_z)/L_z$, with $f_W$ being the separation sorbent diffusion correction factor (0.654), $A_z$ being the cross sectional area of the oxygen separation sorbent and thus the cross sectional area which is filled with oxygen separation sorbent inside the oxygen separation device in [cm$^2$], and $L_z$ being the position of the diffusion reducing channel and thus its distance from the gas inlet of the oxygen separation device at its primary side in [cm]. Furthermore, the spacer characteristic parameter S is defined as $S=L_d/(N*A_d)$, with $A_d$ being the cross sectional area of one duct in the spacer [cm$^2$], with $L_d$ being the length of the diffusion reducing channel with $A_d$ through the separator in [cm], and N being the number of ducts of the spacer.

An oxygen separation device like described above provides significantly reduced contamination of the oxygen separation sorbent particularly during off-times of the oxygen separator and thus significantly improves its maintenance behavior.

The oxygen separation device comprises a gas inlet at a primary side for guiding a flow of oxygen comprising gas into the oxygen separation device and has a gas outlet at a secondary side for guiding a flow of oxygen enriched gas out of the oxygen separation device.

The oxygen separation device further comprises at least one oxygen separation area with an oxygen separation sorbent being capable of separating oxygen from an oxygen comprising by sorbing at least one component of the oxygen comprising gas apart from oxygen or at least better than oxygen. This feature is in accordance with the general setup of a pressure swing adsorption system according to which a separation sorbent interacts with at least one component of the oxygen comprising gas with the exception of oxygen or better than oxygen and thus lets oxygen pass. This feature allows for at least temporarily immobilizing one or more components of the oxygen comprising gas resulting in a separation of oxygen from further components of the oxygen comprising gas. Non limiting examples for oxygen separation sorbents include zeolites, such as sodium or lithium zeolites. The gas flow, in particular the flow of oxygen comprising gas into the oxygen separation device and the flow of oxygen enriched gas out of the oxygen separation device may thereby be reached by providing a pressure adjusting device which creates a pressure difference between the primary side and the secondary side of the oxygen separation device.

However, due to the fact that the oxygen separation sorbent is contaminatable by a contaminant potentially being present in the oxygen comprising gas, the oxygen separation capacity may decrease in case a significant amount of contaminant, such as water or carbon dioxide, for example, is sorbed by the oxygen separation sorbent. In order to minimize, or to completely avoid, such a decrease of oxygen separation capacity, or oxygen selectivity, for example, the oxygen separation device further comprises a decontamination area with a decontamination material, particularly a decontamination sorbent, for decontaminating the oxygen comprising gas from the contaminant. Consequently, by providing a decontamination material, one or more contaminants are removed from the flow of oxygen comprising gas in order to avoid a negative influence of the contaminants to the oxygen separation sorbent. Therefore, the decontamination material is provided in a decontamination area which has as main object to remove the contaminants thereby not negatively influencing the oxygen separation behavior of the oxygen separation sorbent. Consequently, it may be preferred that the decontamination area may be provided upstream the oxygen separation area. Furthermore, the decontamination area may be provided in the main flowing path of the oxygen comprising gas.

Even though a contamination of the oxygen separation sorbent may be prevented well in a normal working mode, especially oxygen separation devices provided in portable oxygen separators may be very sensitive against contamination with respect to off-times of the oxygen separator, because of their limited amount of oxygen separation sorbent, for example.

In detail, with respect to a normal and active working mode, the contaminant will be sorbed by the decontamination material during an oxygen separation step and the contaminant will again be removed during a regeneration step. Consequently, the oxygen separation sorbent will not be deteriorated by uptake of contaminates. The amount of contaminants, such as water, which are sorbed by the decontamination material may thereby be higher at low ambient temperatures and may generally be very high, such as up to 30 weight-% by using a sodium zeolite, for example. If, however, the oxygen separator is turned off and is thus in an off-mode, i.e. does not generate oxygen from an oxygen comprising gas, no oxygen separation process and particularly no purging process is performed. During an off-mode, a contaminant may move from the decontamination zone to the separation zone. Inventors have found that this step may take place particularly due to gas phase diffusion. This is due to the fact that particularly gaseous contaminants, such as water vapor, may be present above the decontamination material according to the water isotherm of the decontamination material. As a consequence, the contaminant will diffuse to the oxygen separation sorbent due to respective vapor pressures of the contaminants, wherein the latter will be adsorbed to the oxygen separation sorbent. This effect will increase with increasing temperature. As a result, the oxygen separation sorbent, which is not deteriorated during a regular working mode comprising an equilibrium, will be polluted especially during off-times. Consequently, inventors have found that especially during off-times of the oxygen separation device, which exemplarily may lie in a range of hours, a contamination may be increased and expanded to a greater volume, and thus maintenance is especially deteriorated by means of long off-times.

In order to minimize or to completely avoid this effect, the oxygen separation area and the decontamination area are fluidly connected by a spacer comprising at least one diffusion reducing channel, wherein the spacer has a value of diffusion reduction $r_R$ of $r_R > 1$ A fluid connection shall thereby particularly mean a connection through which a fluid, such as particularly a gas, may be guided, for example by providing a respective (partial) pressure difference between either sides of the diffusion reducing channel, or the oxygen separation device, respectively.

Inventors have surprisingly found that by providing spacer comprising at least one diffusion reducing channel, wherein the spacer has a value of diffusion reduction $r_R$ of $r_R > 1$ this measure may be sufficient for significantly reducing or completely avoiding a gas flow caused by diffusion. In detail, by providing a separator like described above, various parameters having an influence of the value of diffusion reduction $r_R$ may be arranged such that diffusion is significantly reduced. Consequently, by providing a value of diffusion reduction $r_R$ of $r_R > 1$, particularly of $r_R > 10$, exemplarily of $r_R > 100$, parameters such as the position of the spacer, or the diffusion reducing channel, the cross-sectional dimensions of respective sorbent materials and the dimensions of the diffusion reducing channel may be chosen such, that they may interact with each other in a positive way, which leads to synergistic effects resulting in a significant decrease of diffusion of contaminants from the decontamination area to the oxygen separation area. With respect to the diffusion reducing channel, a small number of channels, especially having a high aspect ratio of length/radius may be preferred. Basically, to minimize diffusion during off-times of oxygen separators, the ratio of the length of the diffusion reducing channels to the radius should preferably be large. The aspect ratio as used herein may particularly mean the ratio of the length 1 of the diffusion reducing channel to its effective radius R(eff) (1/R(eff)), wherein the effective radius may be defined as $R(eff) = \sqrt{(A/\pi)}$ with A being the cross sectional area.

The spacer comprising at least one diffusion reducing channel may in one embodiment be formed by a porous structure. For example, porous structures made from plastics and which are usable as filter materials may be used and may for example be purchasable from the company genpore. Exemplarily, the spacer may be formed from the so called Ultra High Molecular Weight Polyethylene (UHMW PE) which is obtainable by the company genpore and which has a pore size of 50 microns and an average pore density of 40-50% of void volume. However, further porous structures may be used in case they fulfill the above defined requirements.

According to the invention, a gas flow from the decontamination area to the oxygen separation area which is solely caused by diffusion may be significantly reduced, or preferably completely avoided. Apart from that, the normal working behavior of the oxygen separator is not or not essentially deteriorated due to the fact that the pressure drop caused by the diffusion reducing channel may in best cases be neglected. As a result, the oxygen separation device according to the invention may work without essential limitations thereby significantly improving the contamination behavior and thus the maintenance behavior.

According to the invention, furthermore a very cost-saving measure is provided due to the fact that solely a spacer with at least one diffusion reducing channel has to be added between the oxygen separation area and the decontamination area. An oxygen separation device like described above may thus be formed easy and cost-saving. The controlling of the oxygen separator equipped with an oxygen separation device like described above is thereby not complicated.

Apart from that, an oxygen separation device according to the invention may be designed in a very compact design due to the fact that the oxygen separation area and the decontamination area as well as the spacer may be arranged in one single device. This advantage may even more be emphasized by arranging the at least one diffusion reducing channel preferably in a compact spacer, such as in a spacer having a disc-like structure. Furthermore, the requirement of complex pipings and/or valves may be avoided.

An oxygen separation device like described above is especially advantageous with respect to medical home care applications and provides essentially improved maintenance behavior compared to comparable oxygen separation devices known in the art and which furthermore provides a reduced sensitivity to impurities especially after long off times of an oxygen separator equipped with such an oxygen separation device. It thus ensures an improved separation behavior even after long off times.

Additionally, especially oxygen separation devices being present in portable oxygen concentrators are sensitive against impurities because of their limited space of the oxygen separation device, or the limited amount of oxygen separation material, respectively. For example, with respect to portable oxygen concentrators, impurities such as a water uptake of the oxygen separation material may under circumstances lead quickly to decreased oxygen selectivity, for example. Consequently, the arrangement according to the invention is especially advantageous for portable devices or for devices comprising a small oxygen separation device and/or a limited amount of oxygen separation material.

According to an embodiment the decontamination material comprises particles and the cross-sectional area $A_d$ of one diffusion reducing channel has the dimensions of $A_b/2 < A_d < A_z/3$, wherein $A_b$ corresponds to the average cross-sectional area of the decontamination material particles and $A_z$ corresponds to the cross-sectional area of the decontamination material and thus the filled cross sectional area of the interior of the oxygen separation device, and/or wherein the oxygen separation material comprises particles and the cross-sectional area $A_d$ of one diffusion reducing channel has the dimensions of $A_b/2 < A_d < A_z/3$, wherein Ab corresponds to the average cross-sectional area of the oxygen separation particles and Az corresponds to the cross-sectional area of the oxygen separation material and thus the filled cross sectional area of the interior of the oxygen separation device.

Inventors have found that according to this embodiment an especially low pressure drop may be provided when a gas flows through the oxygen separation device and thus through the spacer. Consequently, according to this embodiment, the diffusion of contaminants from the decontamination area to the oxygen separation area is significantly reduced and furthermore the general working behavior of the oxygen separation device during an oxygen separation process is not negatively influenced. This may be realized because the pressure drop is hold in limited dimensions allowing a good working behavior even when using a limited pressure difference between the primary side and the secondary side of the oxygen separation device. This allows operating and forming the oxygen separator with limited requirements with respect to pressure difference and thus with low costs. Generally, the cross-sectional area $A_d$ of one diffusion reducing channel may be chosen as high as possible to have a low pressure drop and at the same time having a high factor of contaminant diffusion.

According to a further embodiment the diffusion reducing channel comprises at least one section proceeding in a direction deviating from the main direction of the spacer. According to this embodiment the diffusion reducing channel thus comprises a gas flowing path which is not arranged straight or strictly straight with respect to its gas inlet and its gas outlet but which comprises a certain structure with varying directions. For example, the diffusion reducing channel may comprise a flow path which at least partly proceeds in a direction having a right angle with respect to the main direction. According to this embodiment the length of the flowing path between the inlet and the outlet of the diffusion reducing channel and thus from one side of the spacer to an opposite side may be significantly elongated resulting in a significantly reduced diffusion of particularly gaseous contaminants from the decontamination area to the oxygen separation area. Furthermore, a spacer comprising such a diffusion reducing channel and thus the respective oxygen separator may be formed in very compact dimensions, which may be particularly advantageous with respect to portable devices. The main direction of the spacer may thereby particularly mean the direction which corresponds to the theoretically shortest possible direction proceeding from the decontamination material to the oxygen separation sorbent and thus from the inlet side (primary side) of the spacer to its outlet side (secondary side) or in other words the (theoretic) main flowing direction of a gas through the spacer. The main direction thus essentially corresponds to a straight connection of the decontamination area and the oxygen separation area.

According to a further embodiment the diffusion reducing channel at least partly comprises a curved structure and/or an angled structure. Especially by providing one or more curved structures and/or one or more angled structures of the diffusion reducing channel, the flowing path may be significantly elongated particularly in case the one or more curved structures and/or the one or more angled structures pass in a plane proceeding rectangular with respect to the main direction of the diffusion reducing channel. A curved structure shall thereby particularly mean a structure which is not or not completely straight, but which comprises one or more curved regions, such as a circular or semi circular structure. Correspondingly, an angled structure may particularly mean a structure which is as well not or not completely straight but comprises regions having directions forming an angle between them.

According to a further embodiment the curved structure and/or the angled structure is formed as a spiral, in particular as a two-dimensional spiral. A spiral allows to significantly elongating the flowing path and thus the length of the gas flowing path in very compact dimensions. Consequently, a spiral is an especially suitable embodiment for forming a long flowing path and thus for significantly reducing the diffusion strength. A two-dimensional spiral shall thereby particularly mean a spiral proceeding in one plane such as in the form of a snail shell. This structure may be formed strictly curved, like known from an exact snail shell, or it may be angled, for example providing defined straight passages in the structure. It is thereby obvious for one skilled in the art that especially the inlet and/or the outlet of the spiral structure may leave the two-dimensional form without leaving this embodiment.

According to a further embodiment two curved structures are provided each proceeding in a plane essentially perpendicular to the main direction of the spacer and being fluidly connected to each other, for example by a connection proceeding in the main direction of the spacer, wherein a first curved structure is connected to the oxygen separation area and a further curved structure is connected to the decontamination area and/or wherein two angled structures are provided each proceeding in a plane essentially perpendicular to the main direction of the spacer and being fluidly connected to each other, for example by a connection proceeding in the main direction of the spacer, wherein a first angled structure is connected to the oxygen separation area and a further angled structure is connected to the decontamination area. According to this embodiment two curved and/or angled structures may be provided which each proceed in a plane lying substantially parallel to each other. According to this embodiment, again, a significant raise of the length of the flowing path may be realized leading to an especially reduced diffusion of contaminants from the decontamination area to the oxygen separation area. This allows generating a module-like structure of the respective diffusion reducing devices comprising the diffusion reducing channels particularly in case the devices are formed as flat and for example disc-like structures. According to this, a great adaptability of the length of the diffusion reducing channel and thus of the diffusion behavior may be provided. Of course, it is furthermore possible to arrange a curved structure together with an angled structure like described above with respect to two curved and/or angled structures. However, two or more than two curved or angled structures may be preferred due to manufacturing reasons.

According to a further embodiment a valve is arranged in the diffusion reducing channel. According to this embodiment, the fluid connection between the oxygen separation area and the decontamination area may be completely closed especially and preferably only during off-times by a valve, such as by a check valve. Consequently, diffusion of gaseous contaminants from the decontamination area to the oxygen separation area may effectively be prevented because of which a contamination of the oxygen separation sorbent during off-times may be securely and completely avoided. The valve may thereby be closed during off-times only to avoid a diffusion of contaminants, but it may be opened during normal working modes, so that a desired gas flow of the oxygen comprising gas through the oxygen separation device and particularly to the oxygen separation area is not negatively influenced.

With this regard, it may be preferred that at least two diffusion reducing channels are provided in each of which a check valve is arranged, at least two check valves being arranged in an antiparallel manner. According to this embodiment the connection from the decontamination area to the oxygen separation area and vice versa is solely opened in case a gas flow is forced through the oxygen separation device for example by providing a pressure difference between the primary side and the secondary side of the oxygen separation device. This may be realized in case the oxygen separation device is in a normal working mode during which the oxygen comprising gas is flowing through the oxygen separation device from its primary side to its secondary side, thereby separating oxygen from the oxygen comprising gas and providing a flow of pure or essentially pure oxygen or at least a flow of oxygen enriched gas. In case the oxygen separation device is in a regeneration mode, a gas is forced to flow in the antiparallel direction and thus from the secondary side to the primary side in order to remove components, such as nitrogen, from the oxygen separation sorbent and furthermore in order to remove contaminants from the decontamination material in the decontamination area. In case check valves are provided, the oxygen separator equipped with such an oxygen separation device does not require complex controlling due to the fact that the valves open or close respectively solely by providing a respective pressure difference between the primary side and the secondary side of the oxygen separation device. Apart from that, a diffusion reducing channel and thus an oxygen separation device may be formed in a cost-saving manner even though a secure and complete sealing is provided between the decontamination area and the oxygen separation area. It is obvious for one skilled in the art that in case two check valves are present, these two check-valves should be arranged in an antiparallel manner. In case more than two check valves are present, at least two check valves have to be arranged in an antiparallel manner, the further valves may be arranged according to the respective requirements.

According to a further embodiment the oxygen separation area comprises a nitrogen sorbing material and/or the decontamination area comprises a water sorbing material.

With respect to the nitrogen sorbing material, a sieve bed may be used for adsorbing nitrogen when guiding a flow of oxygen comprising gas through the latter. The sieve bed may thus comprise a material which is capable of sorbing, or adsorbing nitrogen but does less or not interact with oxygen in order to let the oxygen pass through and to generate a flow of pure or essentially pure oxygen, or of oxygen enriched gas, respectively. The sieve bed may thus comprise a zeolite material, for example a lithium zeolite, such as the sieve material being purchasable under its name SXSDM from the firm CECA. Especially by using a sieve bed, contaminants may stay at the decontamination area, until they are removed by a purging process.

With respect to the decontamination material comprising a water sorbing material, or a drying agent, respectively, especially water is a contaminant which forms a kind of equilibrium, for example with a sieve bed, and does thus not deteriorate the oxygen separation behavior of the oxygen separation device during normal working mode in an essential manner when being in a steady state. If however the oxygen separation device is turned off, for example, and leaves the conditions of the equilibrium, water may easily move to the oxygen separation sorbent according to prior art. Consequently, especially in case the contaminant comprises water, the provision of a drying agent is advantageous and improves the maintenance behavior as well as the selectivity for oxygen separation. Apart from that, by using a sieve bed for the decontamination material, it is especially effective to remove or desorb the contaminants and to immobilize them at the decontamination material. Consequently, especially by using a sieve bed the arrangement according to this embodiment is especially advantageous.

With respect to the drying agent basically any drying agent may be used. For example, phosphorous pentoxide, such as the one being purchasable under its name sicapent from the company Merck may be used. Further exemplary drying agents comprise alumina, silica gels or activated carbon. This has the advantage of a high drying capacity together with a limited weight. With respect to the drying capacity, the latter may be determined by the partial pressure above the respective material, or its residual water content in air, at given conditions, such as temperature, load, etc. Furthermore, the same sorbent may be used with respect to a drying agent forming a desiccant layer like being described with respect to the oxygen separation area.

The present invention further relates to an oxygen separator, comprising at least one oxygen separation device according to the invention and thus like described above with optionally one or more of the afore mentioned features. The oxygen separator further comprises a pressure adjusting device for creating a pressure difference between the primary side and the secondary side of the oxygen separation device.

The term pressure adjusting device may refer to any device which is capable of generating a pressure difference between the primary side and the secondary side of the oxygen separation device. It may for example be a gas compression device being connected to the primary side of the oxygen separation device, or a vacuum pump being connected to the secondary side of the oxygen separation device.

An oxygen separator like defined above thus comprises at least one oxygen separation device. It may thus comprise only one oxygen separation device or a plurality of more than one oxygen separation devices. For example, the oxygen separator may comprise two oxygen separation devices and may thus generally form a pressure swing adsorption system (PSA system).

Such an oxygen separator allows significant improvements with respect to maintenance behavior, for example. In detail, the contamination behavior of the active part of the oxygen separation device may significantly be reduced especially after off-times of the oxygen separator.

With respect to further technical features as well as advantages of the oxygen separator according to the invention it is referred to the description of the oxygen separation device and the figures.

According to an embodiment a heating device for heating the oxygen separation device is provided. According to this embodiment, the desorption step may be improved. This may in an exemplary manner especially be the case if the oxygen separation material comprises water as contaminant. It may thus be preferred that the heating device acts on the decontamination area, or the decontamination material, respectively, only. The amount of heating and thus the temperature and time applied may thereby be dependent from the oxygen separation device used and the contaminants which are to be desorbed.

According to a still further embodiment two oxygen separation devices are provided being arranged in parallel and each having at least one oxygen separation area with an oxygen separation sorbent being capable of separating oxygen from an oxygen comprising gas by sorbing at least one component of the oxygen comprising gas apart from oxygen and being contaminatable by a contaminant, wherein each of the oxygen separation devices further comprises a decontamination area with a decontamination material for decontaminating the oxygen comprising gas from at least one contaminant, wherein the oxygen separation area and the decontamination area are fluidly connected by at least one spacer comprising at least one diffusion reducing channel, wherein the spacer has a value of diffusion reduction $r_R$ of $r_R>1$. According to this two oxygen separation devices may be provided each being arranged like discussed above and below. According to this embodiment the oxygen separator may be designed as pressure swing adsorption system (PSA) or as vacuum swing adsorption system (VSA), for example. Especially by thinking about these adsorption systems, the present application is advantageous. In detail, in case one separation device is in a regular working mode, the further oxygen separation device may be in a purging mode. However, in case the purging procedure is shorter compared to the time at which the one oxygen separation device may work properly and thus before a purging step is required for the first oxygen separation device, the further oxygen separation device may be in an off-mode. During that off-mode, for example, the contaminant may diffuse to the oxygen separation area, which may be prevented according to the present invention because of which a significant improvement of the maintenance behavior may be achieved.

With respect to further advantages and technical features of the oxygen separator it is referred to the description of the method of generating oxygen, the figures and the description of the figures.

The present invention further relates to a method of separating oxygen from an oxygen comprising gas by use of an oxygen separation device, or an oxygen separator, respectively, according to the invention, the method comprising the steps of: performing a first cycle of oxygen generation, the first cycle comprising the steps of guiding an oxygen comprising gas to the primary side of an oxygen separation device, and generating a flow of oxygen through the oxygen separation device by creating a pressure difference between the primary side and the secondary side of the oxygen separation device wherein the decontamination area is contaminated by a contaminant, and performing a second cycle of oxygen generation, the second cycle comprising the steps of guiding an oxygen comprising gas to the primary side of an oxygen separation device, and generating a flow of oxygen through the oxygen separation device by creating a pressure difference between the primary side and the secondary side of the oxygen separation device, wherein the decontamination area (21, 23) is contaminated by a contaminant, wherein the oxygen separation device is turned in an off-mode between the first cycle and the second cycle, wherein the contaminant is at least partly hindered to diffuse from the decontamination area to the separation area by a spacer fluidly connecting the oxygen separation area and the decontamination area and comprising at least one diffusion reducing channel, wherein the spacer has a value of diffusion reduction $r_R$ of $r_R>1$.

A method like described above provides a method of generating oxygen on demand which allows a significantly improved contamination behavior of the oxygen separation device used. As a result, a significantly improved maintenance behavior may be achieved.

With respect to further advantages and technical features of the method of generating oxygen it is referred to the description of the oxygen separator, the figures and the description of the figures.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
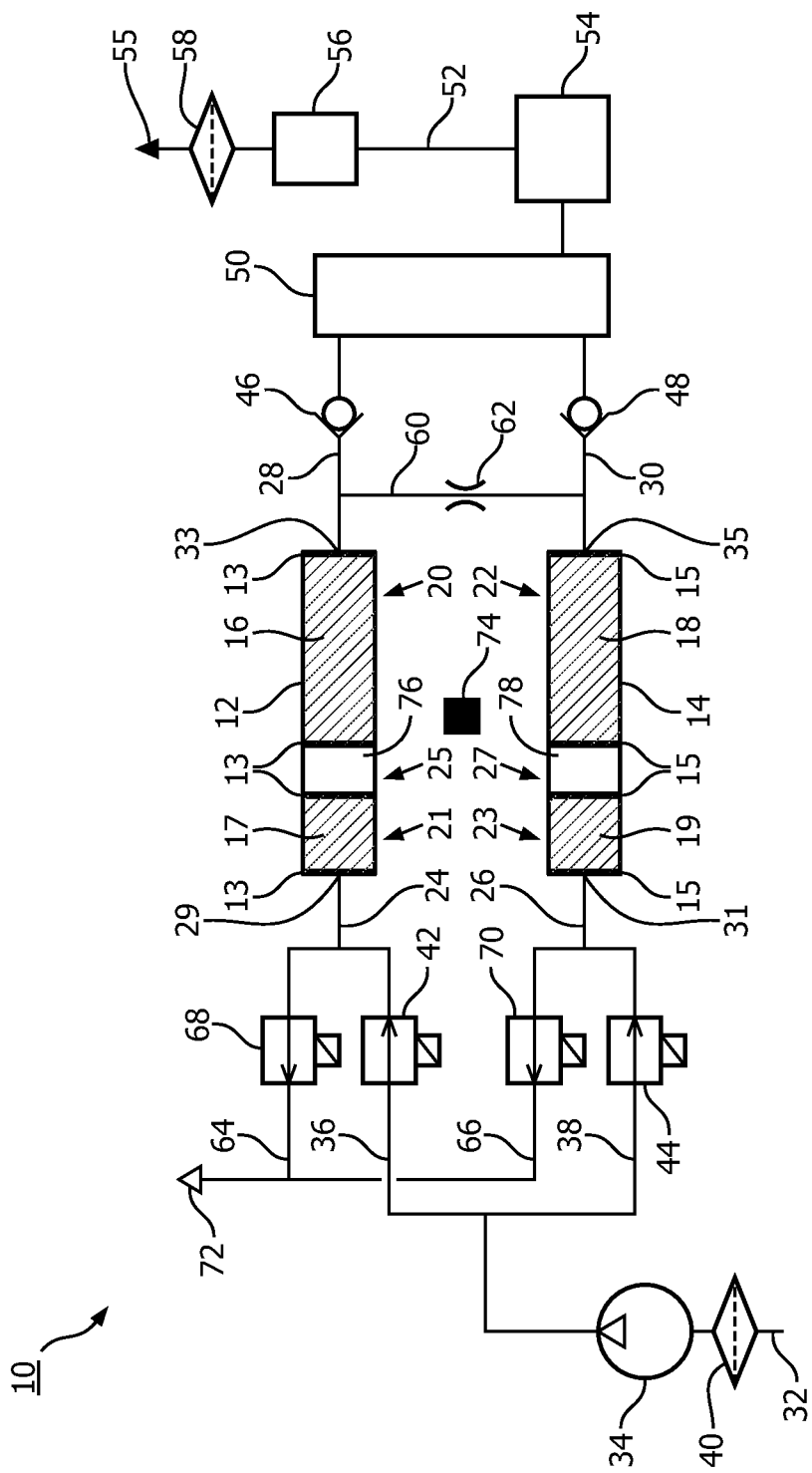
FIG. 1 shows a schematic view of an embodiment of an arrangement comprising an oxygen separation device according to the invention.

In FIG. 1, an oxygen separator 10 for generating oxygen is schematically shown. The oxygen separator 10 may be used for generating oxygen with respect to therapeutic applications, for example in the field of COPD treatment. The oxygen separator 10 may be designed as a stationary arrangement, for example for using it in a hospital, or it may be a portable device, for example for using it in the field of homecare applications. However, the oxygen separator 10 may furthermore be used for any application at which pure or essentially pure oxygen has to be provided, for example in air planes or for welding purposes. Such an oxygen concentrator, or oxygen separator, respectively, may be based on an oxygen concentrator such as the one called EverGo and which is purchasable from Philips Respironics.

The oxygen separator 10 comprises at least one oxygen separation device 12 which is capable of separating oxygen from an oxygen comprising gas. However, it is preferred that the oxygen separator 10 comprises at least two oxygen separation devices 12, 14 being arranged in parallel. In the following, the invention is described with respect to two oxygen separation devices 12, 14. However, it is clear for one skilled in the art that every feature may be provided correspondingly by using just one oxygen separation device 12 or more than two oxygen separation devices 12, 14. Each oxygen separation device 12, 14 may be formed as a sieve bed and may be equipped with an oxygen separation sorbent 16, 18 which is contaminatable by a contaminant, for example by water or carbon dioxide and which is provided in an oxygen separation area 20, 22. The oxygen separation sorbent 16, 18 is particularly configured for letting oxygen pass without significantly impeding its flow, but for interacting with, or adsorbing, respectively other components being present in an oxygen comprising gas. In case air is used as oxygen comprising gas, it is thus preferred that the oxygen separation material 16, 18 is configured for adsorbing nitrogen. Suitable oxygen separation materials 16, 18 may comprises a zeolite material such as a lithium zeolite material. However it may be possible to use every suitable oxygen separation material 16, 18 known in the art, for example for use in for swing processes, such as pressure swing adsorption ore vacuum swing adsorption processes.

Furthermore, the oxygen separation device 12, 14 comprises a decontamination area 21, 23 with a decontamination material 17, 19 for removing contaminations from the stream of oxygen comprising gas. In one embodiment, the decontamination material 17, 19 may be the same as the oxygen separation material 16, 18. However, the decontamination material 17, 19 may as well be a compound or a mixture of other compounds having an affinity with respect to the contaminants of choice. In a non-limiting example, the decontamination material 17, 19 may be a drying agent.

The oxygen separation area 20, 22 and the decontamination area 21, 23 may each be closed by respective filters 13, 15 securing the mostly solid sorbing agents 16, 18; 17, 19 in place and prevent a loss of the respective sorbing agents 16, 18; 17, 19. For example, the filters 13, 15 may be designed as perforated plates having holes with diameters letting a gas pass but being non-permeable for the used sorbing agents 16, 18; 17, 19.

The oxygen separation area 20, 22 and the decontamination area 21, 23 are further fluidly connected by at least one spacer 76, 78 comprising at least one diffusion reducing channel 80, 82 the diffusion reducing channel 80, 82 being described with reference to the FIGS. 2 to 6 in detail. Furthermore, the spacer 76, 78 is located in a diffusion reducing area 25, 27 between the oxygen separation area 20, 22 and the decontamination area 21, 23. However, generally, the diffusion reducing channel 80, 82 and generally the spacer 76, 78 is adapted for reducing diffusion of the contaminant from the decontamination area 21, 23 to the oxygen separation area 20, 22 in that the spacer 76, 78 has a value of diffusion reduction $r_R$ of $r_R>1$.

An inlet conduct 24 is provided for guiding a flow of oxygen comprising gas to the gas inlet 29 of the oxygen separation device 12 at its primary side. Correspondingly, an inlet conduct 26 is provided for guiding a flow of oxygen comprising gas to the gas inlet 31 of the oxygen separation device 14 at its primary side, respectively. Furthermore, outlet conducts 28, 30 for guiding oxygen enriched gas, or pure oxygen, respectively, out of the oxygen separation devices 12, 14 are connected to gas outlets 33, 35 of the respective oxygen separation device 12, 14.

The inlet conducts 24, 26 of the oxygen separation devices 12, 14 are connected to an inlet 32 of the oxygen separator 10. Connected to the inlet 32 may be a source of oxygen comprising gas, such as a gas storing device or the air surrounding the oxygen separator 10. Additionally, a pressure adjusting device for creating a pressure difference between the primary side and the secondary side of the oxygen separation device 12, 14 may be provided. According to FIG. 1, a compressor 34 is provided for compressing the oxygen comprising gas and forcing it through the inlet conducts 36, 38, which may be part of or connected to the inlet conducts 24, 26, to the oxygen separation devices 12, 14. Downstream or upstream the compressor 34, an inlet filter 40 may be provided in order to provide a first cleaning step of the oxygen comprising gas. In detail, especially solid particles may be filtered out of the oxygen comprising gas.

In order to allow the oxygen comprising gas to be guided through the oxygen separation devices 12, 14 intermittently, inlet valves 42, 44 may be provided in the inlet conducts 36, 38. A valve according to the invention shall be any device which may allow a gas flow, inhibit a gas flow and/or regulate the amount of a gas flow. Consequently, by closing the valve 44 and by opening the valve 42, the oxygen comprising gas may be guided through the first oxygen separation device 12, whereas the oxygen comprising gas may be guided through the second oxygen separation device 14 by opening the valve 44 and by closing the valve 42. Correspondingly, a valve 46, such as a check valve, may be provided in the outlet conduct 28 and a valve 48, such as a check valve, may be provided in the outlet conduct 30. By guiding the oxygen comprising gas through the first oxygen separation device 12, the valve 46 may be opened whereas the valve 48 may be closed. Correspondingly, by guiding the oxygen comprising gas through the second oxygen separation device 14, the valve 48 should be opened whereas the valve 46 should be closed.

Downstream the valves 46, 48, the outlet conducts 28, 30 are connected to an oxygen accumulator 50, or a gas tank, respectively, in order to store the generated oxygen. The oxygen accumulator 50 may be connected to an outlet line 52 in which a flow controller 54 may be provided in order to control a stream of pure oxygen. Apart from that, a purity sensor 56 may be provided in the outlet line 52 in order to monitor the purity of the generated oxygen. Furthermore, an additional filter 58 may be provided in the outlet line 52 before the generated oxygen is guided to an outlet 55. From the outlet 55, the generated oxygen enriched gas may be guided to the desired application, such as to a patient.

The outlet conduct 28 of the first oxygen separation device 12 and the outlet conduct 30 of the second oxygen separation device 14 may be connected by a cross conduct 60 upstream the valves 46, 48, in which a flow regulator 62, such as an orifice or a flow controller, may be provided. This allows guiding a defined part of the generated oxygen, for example generated in the oxygen separation device 12, 14, back through the further oxygen separation device 14, 12, or vice versa, for purging purposes and thus for regenerating the oxygen separation devices 12, 14. With this regard, purging lines 64, 66 are provided at the primary sides of the oxygen separation devices 12, 14, each comprising a valve 68, 70. If oxygen is guided through the oxygen separation devices 12, 14, from their secondary side to their primary side for regeneration purposes, the outflow may then be guided selectively through the purging lines 64, 66 and through an exhaust 72.

Furthermore, a heating device 74 for heating the oxygen separation device 12, 14 may be provided. The heating device 74 may act on the whole oxygen separation device 12, 14 or may only heat special regions, such as the decontamination area 21, 23 for regeneration purposes. In general, every heating device 74 known in the art may be used. For example, heating coils may be provided.

A detailed view of an embodiment of the oxygen separation device 12, 14 and particularly of the spacer 76, 78 comprising the diffusion reducing channel 80, 82 is shown in FIGS. 2 to 6.

Figure 2:
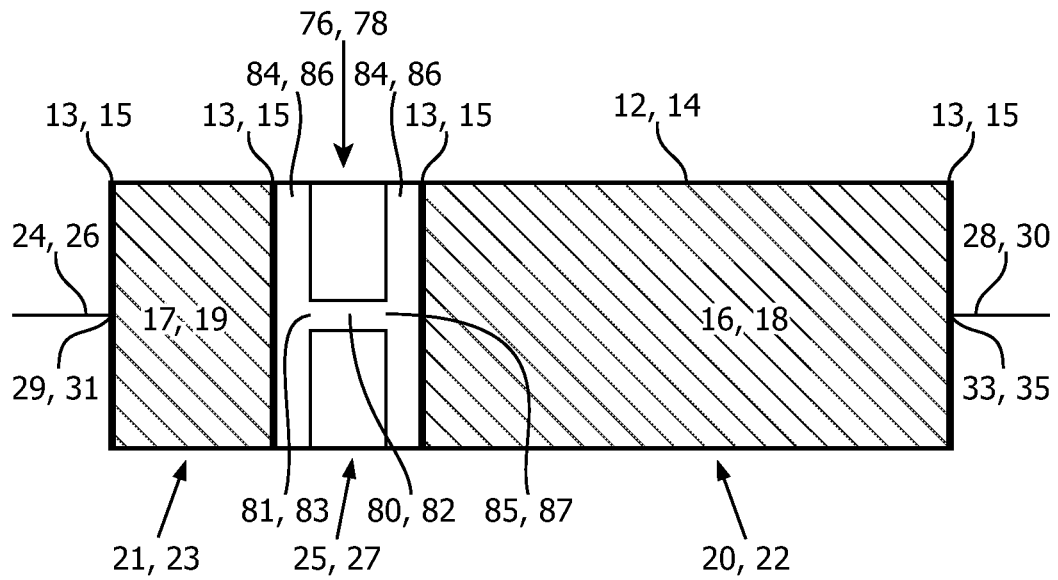
FIG. 2 shows a schematic view of an embodiment of an oxygen separation device according to the invention.

According to FIG. 2, the oxygen separation device 12, 14 comprises a decontamination area 21, 23 with a decontamination material 17, 19 and an oxygen separation area 20, 22 with an oxygen separation sorbent 16, 18. Provided between the decontamination area 21, 23 with the decontamination material 17, 19 and the oxygen separation area 20, 22 with the oxygen separation sorbent 16, 18 the diffusion reducing area 25, 27 is provided in which a spacer 76, 78 is formed. The spacer 76, 78 comprises at least one diffusion reducing channel 80, 82 for fluidly connecting the decontamination area 21, 23 with a decontamination material 17, 19 and the oxygen separation area 20, 22 with the oxygen separation sorbent 16, 18. The spacer 76, 78 has a value of diffusion reduction $r_R$ of $r_R>1$ in order to reduce or to completely avoid diffusion of particularly gaseous contaminants from the decontamination material 17, 19 to the oxygen separation sorbent 16, 18.

The spacer 76, 78 thereby may be incorporated to the inside of the oxygen separation device 12, 14. It may particularly have the same circumference compared to the decontamination area 21, 23 and the oxygen separation area 20, 22. For example, it may comprise a tubular or circular structure. It may be designed as short as possible in order to reduce the building side as far as possible so as to minimize the increased size of the oxygen separation device 12, 14.

Furthermore, the filters 13, 15 are shown which hold the decontamination material 17, 19 and the oxygen separation sorbent 16, 18 in place. Between the filters 13, 15 being located adjacent the diffusion reducing area 25, 27 and the diffusion reducing channel 80, 82, or the spacer 76, 78, respectively, a respective gas volume 84, 86 may be provided. This gas volume 84, 86 serves for collecting the gas flow from the decontamination material 17, 19 or the oxygen separation sorbent 16, 18 in order to guide it through the diffusion reducing channel 80, 82, or for dispersing the gas flow from the diffusion reducing channel 80, 82 into the decontamination material 17, 19 or the oxygen separation sorbent 16, 18, respectively. The gas volume 84, 86 may be part of the decontamination area 21, 23, the oxygen separation area 20, 22, and/or the diffusion reducing area 25, 27. Additionally, the inlet 81, 83 and the outlet 85, 87 of the diffusion reducing channel 80, 82 is shown. It is however obvious for one skilled in the art that the marking inlet and outlet refers to one flow direction of the gas stream, wherein the shown marking refers to a gas flow from the primary side to the secondary side of the oxygen separation device 12, 14. When providing a gas stream flowing from the secondary side to the primary side of the oxygen separation device 12, 14, the location marked as inlet of course serves as outlet and vice versa.

In an exemplary manner, the value of diffusion reduction $r_R$ may be calculated as follows.

Firstly, the characteristic contaminated length or in other words the decontamination material dependent factor Z may be calculated. A typical position of the diffusion reducing channel 80, 82 and thus its distance from the gas inlet 29, 31 of the oxygen separation device 12, 14 at its primary side $L_z$ is: $L_z=3$ cm. Apart from that, a typical diameter of the decontamination material 17, 19 and thus of the inside of the oxygen separation device 12, 14, such as of a zeolite bed, for example in case it has a circular shape, is $d_z=5.4$ cm. Consequently, the cross-sectional area $A_z$ may be calculated to $A_z=(\pi/4) d_z^2=22.9 \cdot cm^2$. By using the diffusion correction factor of 0.654, the decontamination material dependent factor Z with Z being $Z=(f_W*A_z)/L_z$ is thus: 4.989 cm.

Secondly, the separator dependent factor S may be calculated. Having two diffusion reducing channels (N=2), for example, each having a length $L_d$ of 3.175 mm with a cross-sectional area $A_d$ of 4.383 mm$^2$ (with a diameter of 1.181 mm and thus $(\pi/4) d_z^2=22.9$ cm$^2$), the spacer dependent parameter being $S=L_d/(N*A_d)$ may thus be calculated to 3.622*1/cm.

It is clear for one skilled in the art that the above calculation is especially fitted for cylindrical oxygen separation devices having cylindrical decontamination areas as well as cylindrical oxygen separation areas. However, in case the strictly cylindrical form is left, it is possible by calculating all average diameters or cross sectional areas, for example, for getting to the respective sectional areas.

The value of diffusion reduction $r_R$ being $r_R=Z*S$ may thus be calculated to 18.071, which fulfils the requirement according to the invention. Having in mind that $r_R=1$ corresponds to halved diffusion, it becomes clear that a significant decrease of diffusion rate may be achieved. Correspondingly, the reduction factor of contaminant diffusion rate $f_{red}$ being $f_{red}=1+r_R$ may be calculated to 19.071.

With respect to a further example, and having the same decontamination area 21, 23 but a different spacer 76, 78, the value of diffusion reduction $r_R$ may be calculated as follows. This example refers to a spacer 76, 78 having five diffusion reducing channels 80, 82 (N=5) having a length $L_d$ of 3.175 mm and a cross sectional area of 7.548 mm$^2$, the spacer dependent parameter being $S=L_d/(N*A_d)$ may thus be calculated to 0.841*1/cm. Consequently, value of diffusion reduction $r_R$ being $r_R=Z*S$ may thus be calculated to 4.197, still being a significant decrease of diffusion reduction. Correspondingly, the reduction factor of contaminant diffusion rate $f_{red}$ being $f_{red}=1+r_R$ may be calculated to 5.197.

Figure 3:
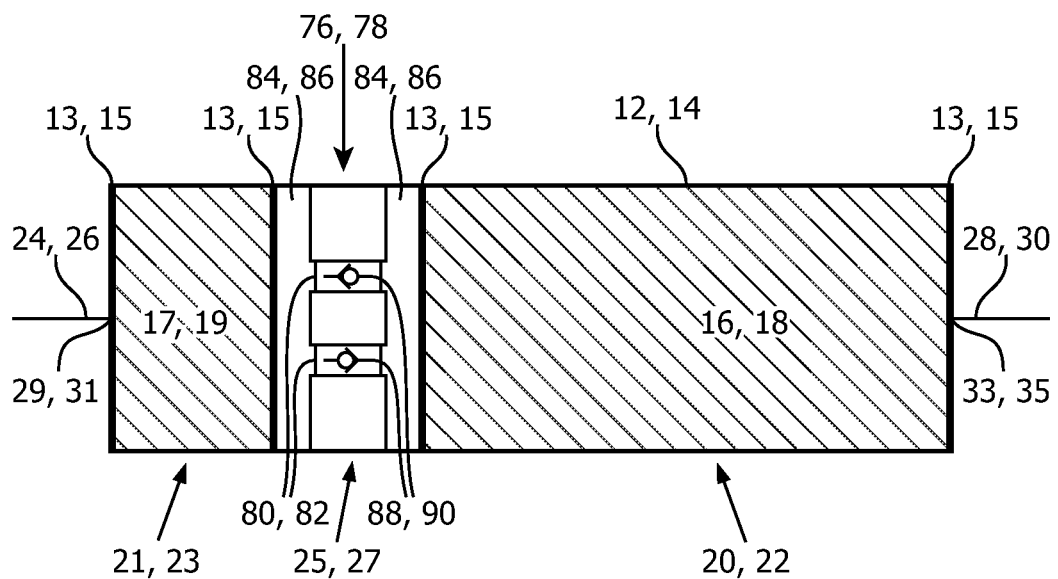
FIG. 3 shows a schematic view of a further embodiment of an oxygen separation device according to the invention.

In FIG. 3, a further embodiment of an oxygen separation device 12, 14 for an oxygen concentrator 10 according to the invention is schematically shown. With respect to the embodiment according to FIG. 3 the same numerals define the same or corresponding features compared to FIG. 2. According to FIG. 3, a valve is arranged in the diffusion reducing channel 80, 82. In detail, according to FIG. 3 two diffusion reducing channels 80, 82 are provided in each of which a check valve 88, 90 is arranged, the check valves 88, 90 being arranged in an antiparallel manner.

Figure 4:
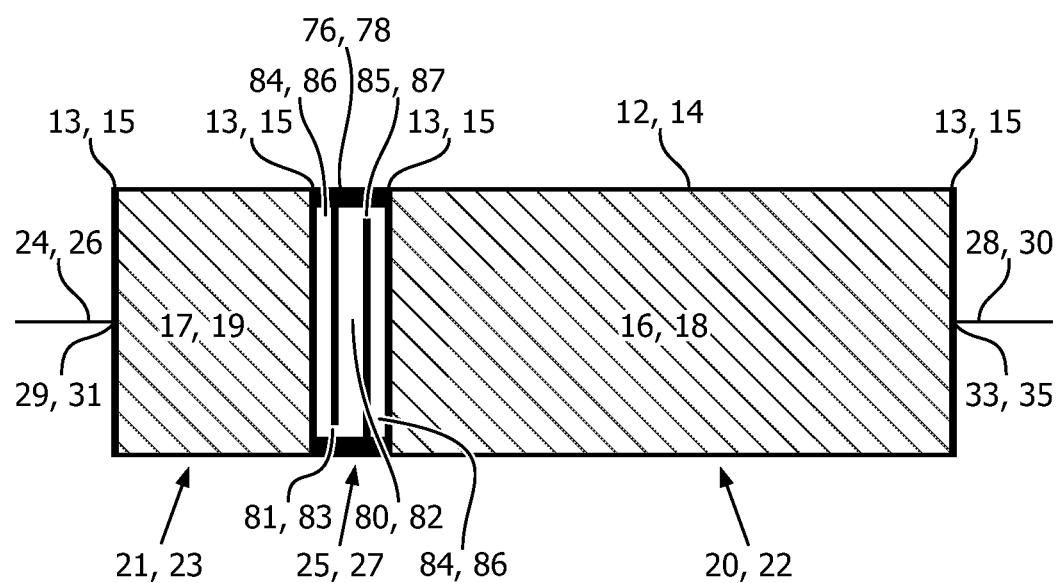
FIG. 4 shows a schematic view of a further embodiment of an oxygen separation device according to the invention.

In FIG. 4, a further embodiment of an oxygen separator 10 is shown. With respect to the embodiment according to FIG. 4 the same numerals define the same or corresponding features compared to FIG. 2 and to FIG. 3. In FIG. 4 it is shown, that the diffusion reducing channel 80, 82 comprises at least one section at least partly proceeding in a direction deviating from the main direction of the spacer 76, 78. FIG. 4 shows that the length of the diffusion reducing channel 80, 82 is significantly increased resulting in a significantly reduced diffusion rate of the contaminants being present in the decontamination area 21, 23 to the oxygen separation area 20, 22. Furthermore, an angled structure of the diffusion reducing channel from its inlet 81, 83 to its outlet 85, 87 may be seen. Additionally, the volume 84, 86 may be formed as a circular structure as will be apparent by the following figures.

Figure 5:
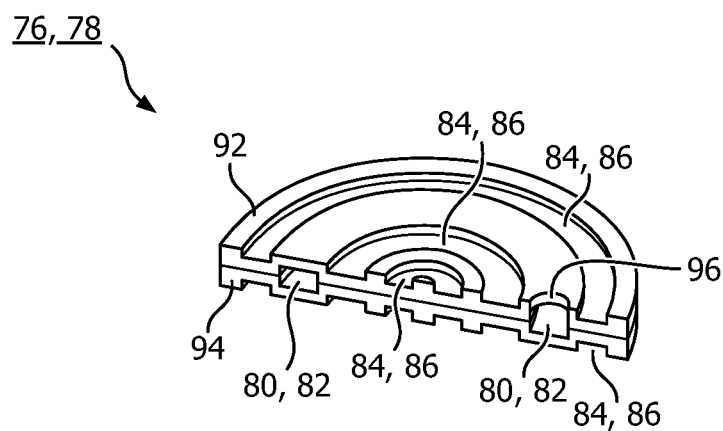
FIG. 5 shows a schematic view of an embodiment of a spacer for an oxygen separation device according to the invention in a sectional view.
Figure 6:
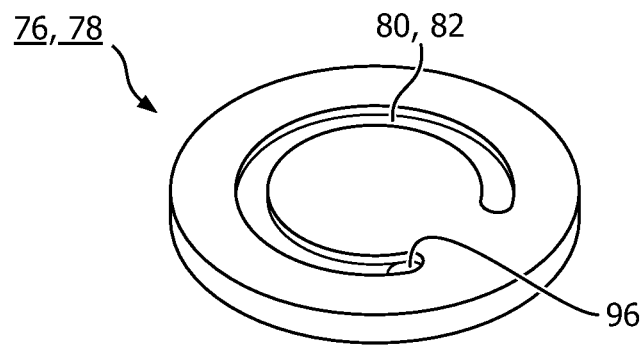
FIG. 6 shows a schematic view of a substructure of the spacer according to FIG. 5.
Figure 7:
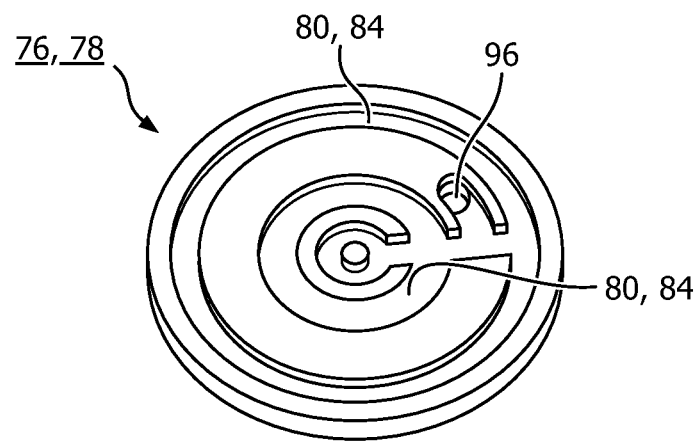
FIG. 7 shows a schematic view of a further substructure of the spacer according to FIG. 5.

In FIGS. 5 to 7, the embodiment according to FIG. 4 is shown in more detail, wherein FIGS. 6 and 7 show respective substructures of the spacer 76, 78. Like can be seen from the FIGS. 5 to 7, a spacer 76, 78 may thus be formed by assembling respective substructures.

In FIG. 5, a spacer 76, 78 is shown in a sectional view. It can be seen, that the spacer 76, 78 has a circular form and is furthermore shaped disc-like. It may be formed as one piece, or it may comprise more than one piece, for example two pieces 92, 94 formed as two flat disc-like devices. The respective flowing paths such as the diffusion reducing channel 80, 82, may be formed by grooved recesses in one side of one of the pieces 94, 92 which creates a duct when the two pieces 92, 94 are placed next to each other. The pieces 92, 94 may thereby be formed symmetrically so that only the same device may be used for both pieces 92, 94 in that the pieces 92, 94 are placed next to each other and rotated to line up the grooves. Alternatively, one piece 92, 94 may comprise grooves whereas the further piece 92, 94 creates a wall of the formed duct. In case gas flowing structures are provided on each side of the respective pieces 92, 94, respective closures for closing the ducts may be provided. In order to connect diffusion reducing channels 80, 82 being provided on different sides, a connection 96 may be provided which connects two or more curved structures. The resulting length of the diffusion reducing channels 80, 82 may be variable by rotating the two discs with respect to each other.

As it is desirable to collect and disperse the gas stream across the whole decontamination material 17, 19 and the whole oxygen separation sorbent 16, 18 respectively, the volumes 84, 86 may be designed as circular channels provided in the top and bottom surface of the disc-like structures and preferably on opposite sides of the diffusion reducing channel 80, 82. They may be part of the diffusion reducing channels 80, 82. When the filter 13, 15 is placed adjacent to the surface of the volumes 84, 86, the respective volumes 84, 86, or channels, respectively, create a flowing path for distributing and/or collecting the gas flow through the whole decontamination material 17, 19 and the oxygen separation material 16, 18. The gas may then flow through a connection 96 in order to guide the gas stream into and/or out of the diffusion reducing channels 80, 82.

With respect to this embodiment, and having the same decontamination area 21, 23 discussed with respect to FIG. 2 but a different spacer 76, 78, the value of diffusion reduction $r_R$ may be calculated as follows. This example refers to a spacer 76, 78 having one diffusion reducing channels 80, 82 (N=1) having a length $L_d$ of 90 mm and a cross sectional area of 12 mm$^2$, the spacer dependent parameter being $S=L_d/(N*A_d)$ may thus be calculated to 75*1/cm. Consequently, value of diffusion reduction $r_R$ being $r_R=Z*S$ may thus be calculated to 374.165. It can be seen that according to this embodiment, an enormous decrease of diffusion is reached. Correspondingly, the reduction factor of contaminant diffusion rate $f_{red}$ being $f_{red}=1+r_R$ may be calculated to 375.165.

A method of separating oxygen from an oxygen comprising gas by use of an oxygen separator 10 comprises thus the steps of: performing a first cycle of oxygen generation, the first cycle comprising the steps of guiding an oxygen comprising gas to the primary side of an oxygen separation device 12, 14, and generating a flow of oxygen through the oxygen separation device 12, 14 by creating a pressure difference between the primary side and the secondary side of the oxygen separation device 12, 14, and performing a second cycle of oxygen generation, the second cycle comprising the steps of guiding an oxygen comprising gas to the primary side of an oxygen separation device 12, 14, and generating a flow of oxygen through the oxygen separation device 12, 14 by creating a pressure difference between the primary side and the secondary side of the oxygen separation device 12, 14, wherein the oxygen separation device 12, 14 is turned in an off-mode between the first cycle and the second cycle, wherein the contaminant is at least partly hindered to diffuse from the decontamination area 21, 23 to the separation area 20, 22 by a spacer fluidly connecting the oxygen separation area and the decontamination area comprising at least one diffusion reducing channel, wherein the spacer has a value of diffusion reduction $r_R$ of $r_R>1$.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. Oxygen separation device, comprising
a gas inlet at a primary side for guiding a flow of oxygen comprising gas into the oxygen separation device and having a gas outlet at a secondary side for guiding a flow of oxygen enriched gas out of the oxygen separation device,
at least one oxygen separation area with an oxygen separation sorbent being capable of separating oxygen from an oxygen comprising gas by sorbing at least one component of the oxygen comprising gas apart from oxygen and being contaminatable by a contaminant, and
a decontamination area with a decontamination material for decontaminating the oxygen comprising gas from at least one contaminant, wherein the oxygen separation area and the decontamination area are fluidly connected by a spacer comprising at least one diffusion reducing channel, wherein the spacer and the at least one diffusion reducing channel are adapted for reducing diffusion of the at least one contaminant from the decontamination area to the at least one oxygen separation area, and wherein the spacer has a value of diffusion reduction $r_R$ of $r_R>1$, wherein the value of diffusion reduction $r_R$ is determined by $r_R=Z*S$, wherein Z is a characteristic contaminated length and S is a spacer characteristic parameter, wherein Z is determined by $Z=(f_W*A_z)/L_z$, wherein $f_W$ is a separation sorbent diffusion correction factor, $A_z$ is a cross-sectional area of the oxygen separation area, and $L_z$ is a position of the diffusion reducing channel, and wherein S is determined by $S=L_d/(N*A_d)$, wherein $L_d$ is a length of the individual spacer diffusion reducing channel, N is a number of spacer diffusion reducing channels, and $A_d$ is a cross-sectional area of an individual spacer diffusion reducing channel, so as to reduce diffusion of the at least one contaminant from the decontamination material of the decontamination area to the oxygen separation sorbent of the at least one oxygen separation area.

2. Oxygen separation device according to claim 1, wherein the spacer has the value of diffusion reduction $r_R$ of $r_R>100$ so as to reduce diffusion of the at least one contaminant from the decontamination material of the decontamination area to the oxygen separation sorbent of the at least one oxygen separation area.

3. Oxygen separation device according to claim 1, wherein the decontamination material comprises particles and the cross-sectional area $A_d$ of one diffusion reducing channel has the dimensions of $A_b/2<A_d<A_z/3$, and/or wherein the oxygen separation material comprises particles and the cross-sectional area $A_d$ of one diffusion reducing channel has the dimensions of $A_b/2<A_d<A_z/3$, wherein $A_b$ corresponds to the average cross-sectional area of the oxygen separation particles and $A_z$ corresponds to the cross-sectional area of the oxygen separation material.

4. Oxygen separation device according to claim 1, wherein the diffusion reducing channel comprises at least one section proceeding in a direction deviating from the main direction of the spacer.

5. Oxygen separation device according to claim 4, wherein the diffusion reducing channel at least partly comprises a curved structure and/or an angled structure.

6. Oxygen separation device, comprising:
a gas inlet at a primary side for guiding a flow of oxygen comprising gas into the oxygen separation device and having a gas outlet at a secondary side for guiding a flow of oxygen enriched gas out of the oxygen separation device;
at least one oxygen separation area with an oxygen separation sorbent being capable of separating oxygen from an oxygen comprising gas by sorbing at least one component of the oxygen comprising gas apart from oxygen and being contaminatable by a contaminant; and
a decontamination area with a decontamination material for decontaminating the oxygen comprising gas from at least one contaminant, wherein the oxygen separation area and the decontamination area are fluidly connected by a spacer comprising at least one diffusion reducing channel, wherein the spacer and the at least one diffusion reducing channel are adapted for reducing diffusion of the at least one contaminant from the decontamination area to the at least one oxygen separation area, wherein the spacer has a value of diffusion reduction $r_R$ of $r_R>1$, wherein the value of diffusion reduction $r_R$ is determined by $r_R=Z*S$, wherein Z is a characteristic contaminated length and S is a spacer characteristic parameter, wherein Z is determined by $Z=(f_W*A_z)/L_z$, wherein $f_W$ is a separation sorbent diffusion correction factor, $A_z$ is a cross-sectional area of the oxygen separation area, and $L_z$ is a position of the diffusion reducing channel, and wherein S is determined by $S=L_d/(N*A_d)$, wherein $L_d$ is a length of the individual spacer diffusion reducing channel, N is a number of spacer diffusion reducing channels, and $A_d$ is a cross-sectional area of an individual spacer diffusion reducing channel, and wherein the curved structure and/or the angled structure is formed as a spiral.

7. Oxygen separation device according to claim 5, wherein two curved structures are provided each proceeding in a plane essentially perpendicular to the main direction of the spacer and being fluidly connected to each other, wherein a first curved structure is connected to the oxygen separation area and a further curved structure is connected to the decontamination area and/or wherein two angled structures are provided each proceeding in a plane essentially perpendicular to the main direction of the spacer and being fluidly connected to each other, wherein a first angled structure is connected to the oxygen separation area and a further angled structure is connected to the decontamination area.

8. Oxygen separation device according to claim 1, wherein a valve is arranged in the diffusion reducing channel.

9. Oxygen separation device according to claim 8, wherein at least two diffusion reducing channels are provided in each of which a check valve is arranged, at least two check valves being arranged in an antiparallel manner.

10. Oxygen separation device according to claim 1, wherein the oxygen separation area comprises a nitrogen sorbing material and/or wherein the decontamination area comprises a water sorbing material.

11. Oxygen separator, comprising at least one oxygen separation device according to claim 1, further comprising a pressure adjusting device for creating a pressure difference between the primary side and the secondary side of the oxygen separation device.

12. Oxygen separator according to claim 11, wherein a heating device for heating the oxygen separation device is provided.

13. Oxygen separator according to claim 11, wherein two oxygen separation devices are provided being arranged in parallel and each having at least one oxygen separation area with an oxygen separation sorbent being capable of separating oxygen from an oxygen comprising gas by sorbing at least one component of the oxygen comprising gas apart from oxygen and being contaminatable by a contaminant, wherein each of the oxygen separation devices further comprises a decontamination area with a decontamination material for decontaminating the oxygen comprising gas from at least one contaminant, wherein the oxygen separation area and the decontamination area are fluidly connected by at least one spacer comprising at least one diffusion reducing channel, wherein the spacer has a value of diffusion reduction $r_R$ of $r_R>1$.

14. Method of separating oxygen from an oxygen comprising gas by use of an oxygen separation device according to claim 1, the method comprising the steps of:
performing a first cycle of oxygen generation, the first cycle comprising the steps of guiding an oxygen comprising gas to the primary side of an oxygen separation device, and generating a flow of oxygen through the oxygen separation device by creating a pressure difference between the primary side and the secondary side of the oxygen separation device, wherein the decontamination area is contaminated by a contaminant, and
performing a second cycle of oxygen generation, the second cycle comprising the steps of guiding an oxygen comprising gas to the primary side of an oxygen separation device, and generating a flow of oxygen through the oxygen separation device by creating a pressure difference between the primary side and the secondary side of the oxygen separation device, wherein the decontamination area is contaminated by a contaminant, wherein the oxygen separation device is turned in an off-mode between the first cycle and the second cycle, wherein the contaminant is at least partly hindered to diffuse from the decontamination area to the separation area by a spacer fluidly connecting the oxygen separation area and the decontamination area and comprising at least one diffusion reducing channel, wherein the spacer has a value of diffusion reduction $r_R$ of $r_R>1$, wherein the value of diffusion reduction $r_R$ is determined by $r_R=Z*S$, wherein Z is a characteristic contaminated length and S is a spacer characteristic parameter, wherein Z is determined by $Z=(f_W*A_z)/L_z$, wherein $f_W$ is a separation sorbent diffusion correction factor, $A_z$ is a cross-sectional area of the oxygen separation area, and $L_z$ is a position of the diffusion reducing channel, and wherein S is determined by $S=L_d/(N*A_d)$, wherein $L_d$ is a length of the individual spacer diffusion reducing channel, N is a number of spacer diffusion reducing channels, and $A_d$ is a cross-sectional area of an individual spacer diffusion reducing channel.

* * * * *